US009146089B2

(12) United States Patent
Baruchello et al.

(10) Patent No.: US 9,146,089 B2
(45) Date of Patent: Sep. 29, 2015

(54) METHOD AND APPARATUS FOR MEASURING A MANUFACTURING DEVIATION IN AN EXTERNAL GEAR

(75) Inventors: Roberto Baruchello, Baricella (IT); Marco Brevigliero, Zocca di Ro Ferrarese (IT)

(73) Assignee: MARPOSS SOCIETA' PER AZIONI, Bentivoglio (BO) (IT)

( * ) Notice: Subject to any disclaimer, the term of this patent is extended or adjusted under 35 U.S.C. 154(b) by 112 days.

(21) Appl. No.: 14/123,591

(22) PCT Filed: Jun. 19, 2012

(86) PCT No.: PCT/EP2012/061654
§ 371 (c)(1),
(2), (4) Date: Dec. 3, 2013

(87) PCT Pub. No.: WO2012/175472
PCT Pub. Date: Dec. 27, 2012

(65) Prior Publication Data
US 2014/0123510 A1 May 8, 2014

(30) Foreign Application Priority Data

Jun. 20, 2011 (IT) .............................. B02011A0353
Jun. 20, 2011 (IT) .............................. B02011A0354

(51) Int. Cl.
*G01B 5/14* (2006.01)
*G01B 5/02* (2006.01)
*G01M 13/02* (2006.01)
*G01B 5/20* (2006.01)

(52) U.S. Cl.
CPC *G01B 5/02* (2013.01); *G01B 5/202* (2013.01); *G01M 13/021* (2013.01)

(58) Field of Classification Search
CPC ........ G01B 5/02; G01B 5/202; G01M 13/021
USPC ................. 33/501.7, 501.12, 501.15, 501.17, 33/501.18
See application file for complete search history.

(56) References Cited

U.S. PATENT DOCUMENTS

| 3,269,021 A | * | 8/1966 | Bonem ...................... 33/501.18 |
| 3,757,425 A | * | 9/1973 | Bouillon et al. ............. 33/501.9 |
| 4,519,242 A | * | 5/1985 | Hofler et al. ................. 33/501.9 |
| 4,610,091 A | * | 9/1986 | Bertz et al. ................. 33/501.15 |
| 4,646,443 A | * | 3/1987 | Hofler ........................ 33/501.15 |

(Continued)

FOREIGN PATENT DOCUMENTS

EP 1 593 950 A1 11/2005

*Primary Examiner* — G. Bradley Bennett
(74) *Attorney, Agent, or Firm* — Dickstein Shapiro LLP

(57) ABSTRACT

Method and apparatus (1) for measuring a manufacturing deviation in an external gear (2). The gear is arranged onto a stationary central pin (3), the external diameter of which is smaller than the internal diameter of the gear so that a relative movement between the gear and the pin is allowed; a coupling member (5), preferably including a head (17) that does not rotate and is adapted to fit into the teeth of the gear, is urged with a predetermined strength against the teeth of the gear in order to mesh with the teeth and concurrently bring an internal lateral surface of the gear into engagement with an external lateral surface of the pin. The position of the central axis (A) of the gear is determined and the manufacturing deviation of the gear is determined as a function of said position. The deviation so determined can be corrected as a function of a reference distance (D) indicative of the radial dimensions of the gear.

23 Claims, 7 Drawing Sheets

(56) References Cited

U.S. PATENT DOCUMENTS

| | | | |
|---|---|---|---|
| 4,769,917 A * | 9/1988 | Bertz et al. | 33/501.7 |
| 7,775,101 B2 | 8/2010 | Baruchello | |
| 2002/0078742 A1 * | 6/2002 | Kim | 73/162 |
| 2008/0028847 A1 * | 2/2008 | Baruchello | 73/162 |
| 2012/0247199 A1 * | 10/2012 | Hirono et al. | 73/162 |
| 2013/0054172 A1 * | 2/2013 | Masuo et al. | 702/94 |
| 2015/0088454 A1 * | 3/2015 | Sugiyama et al. | 702/155 |

* cited by examiner

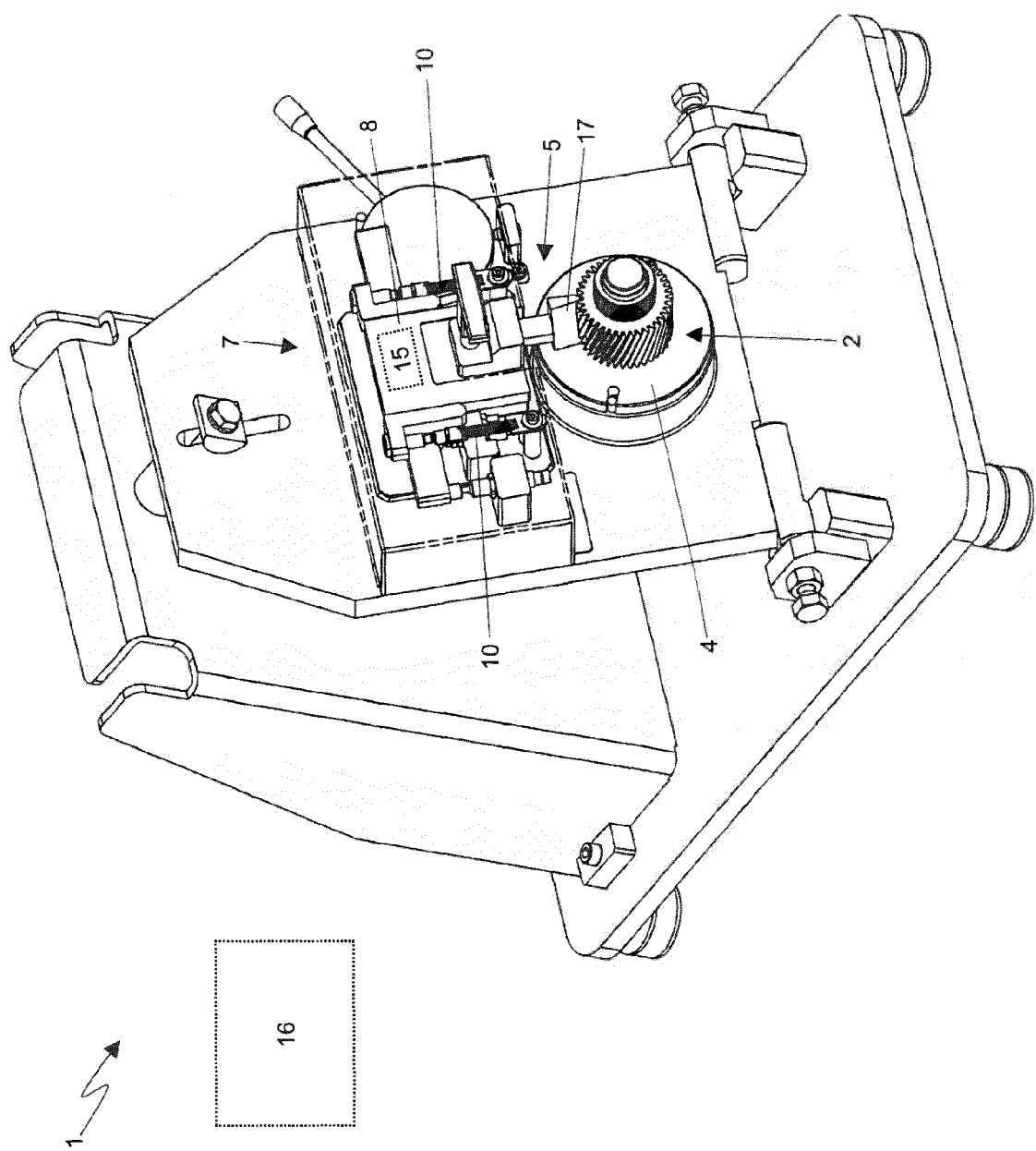

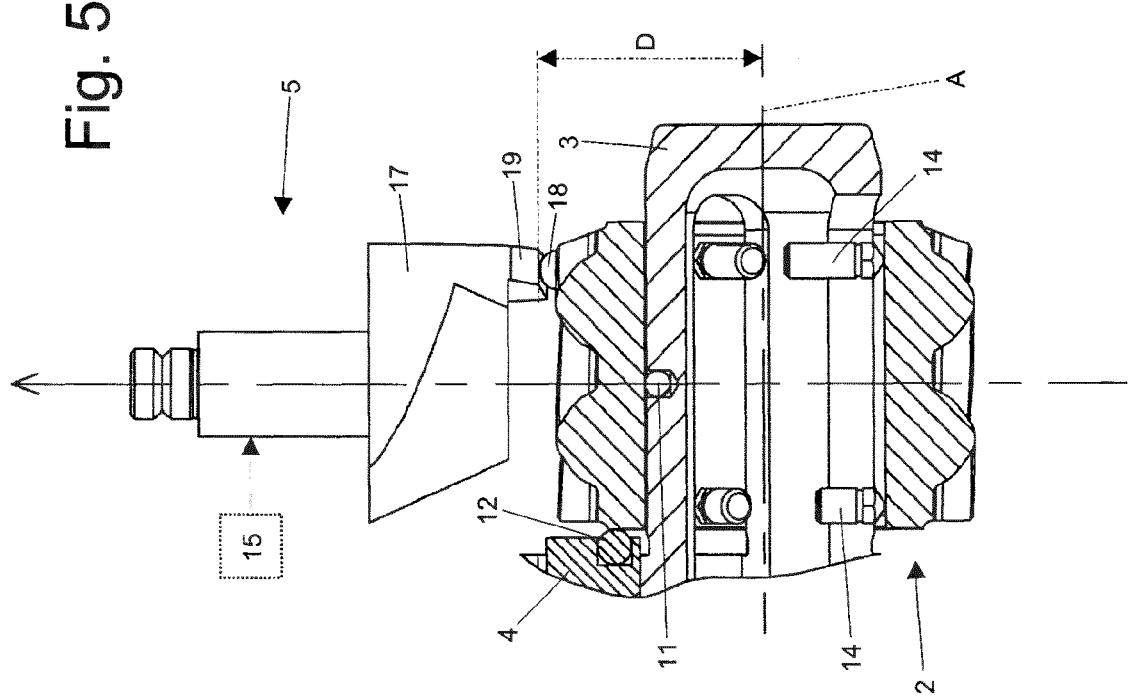
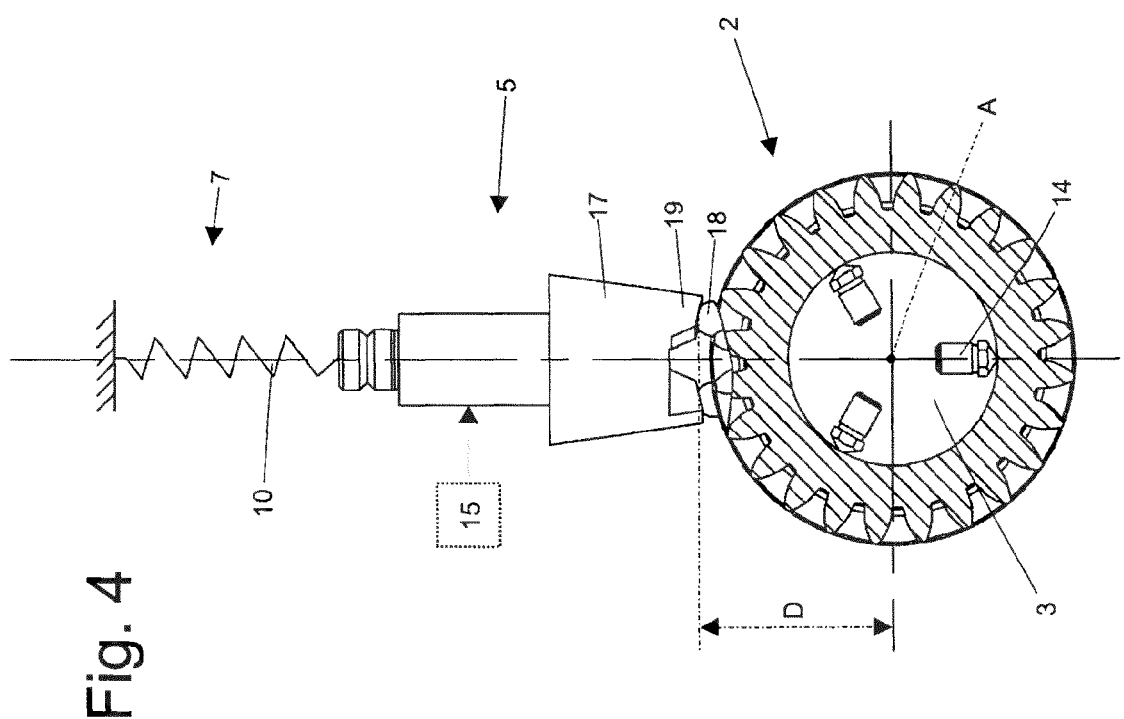

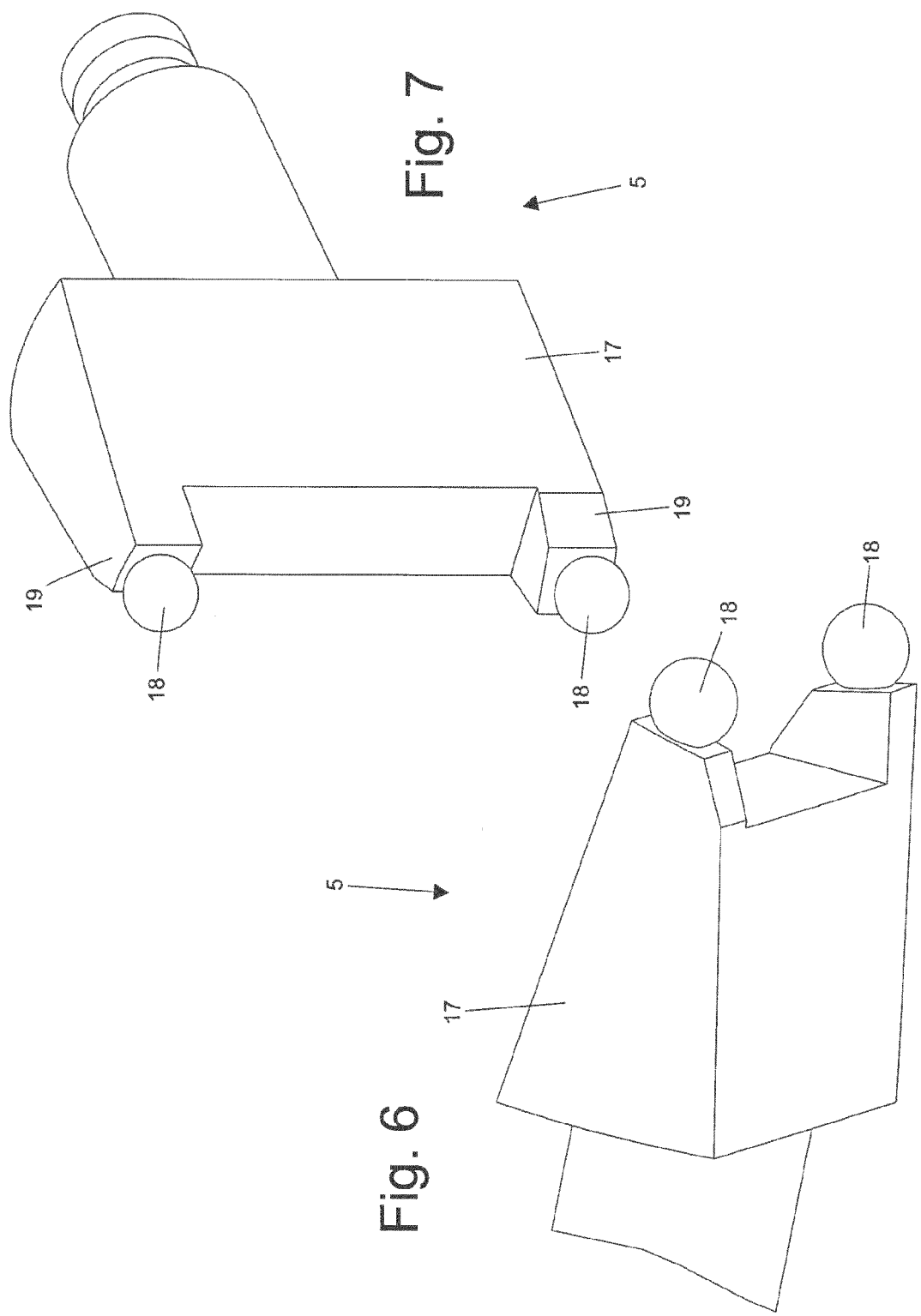

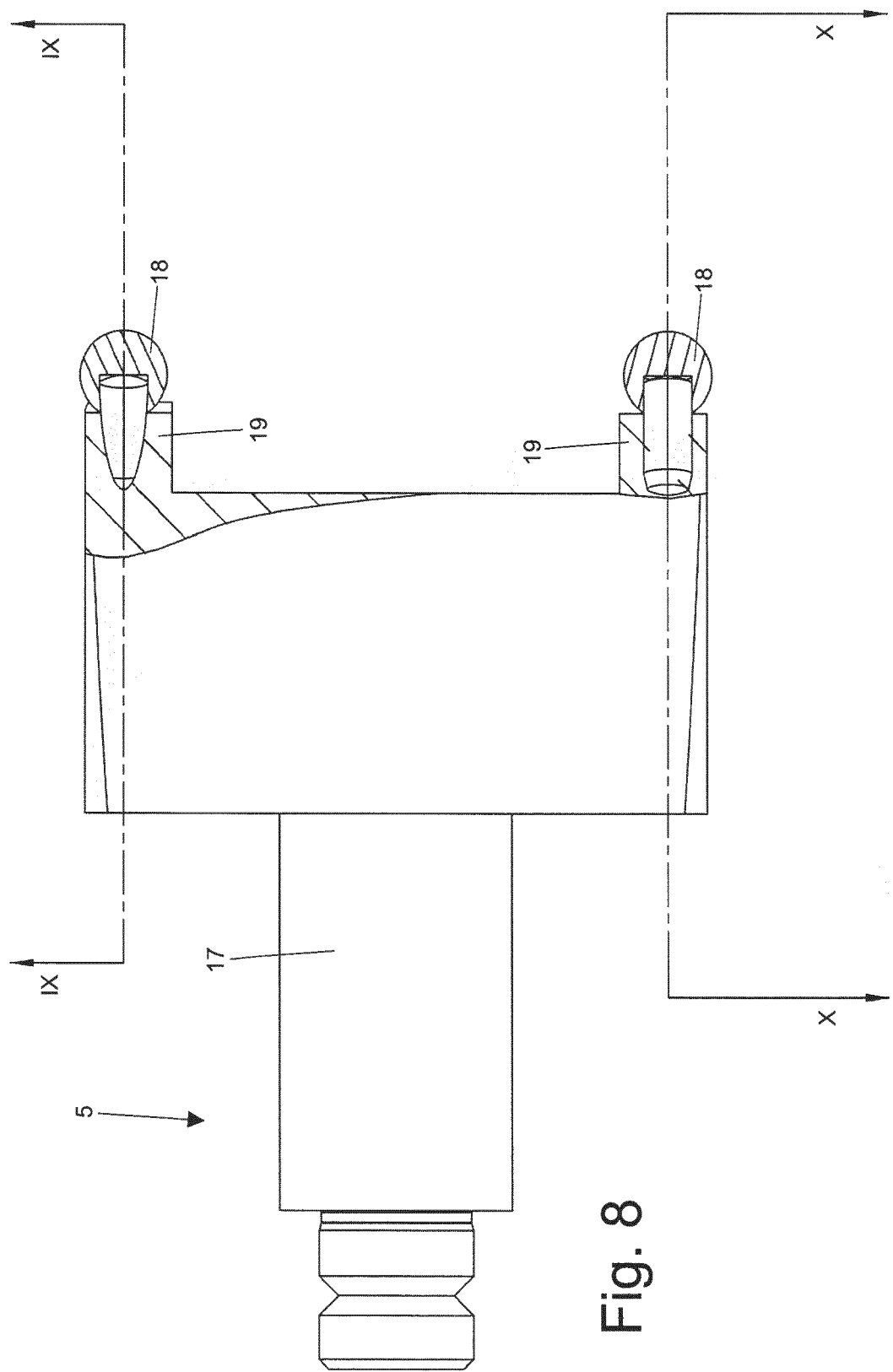

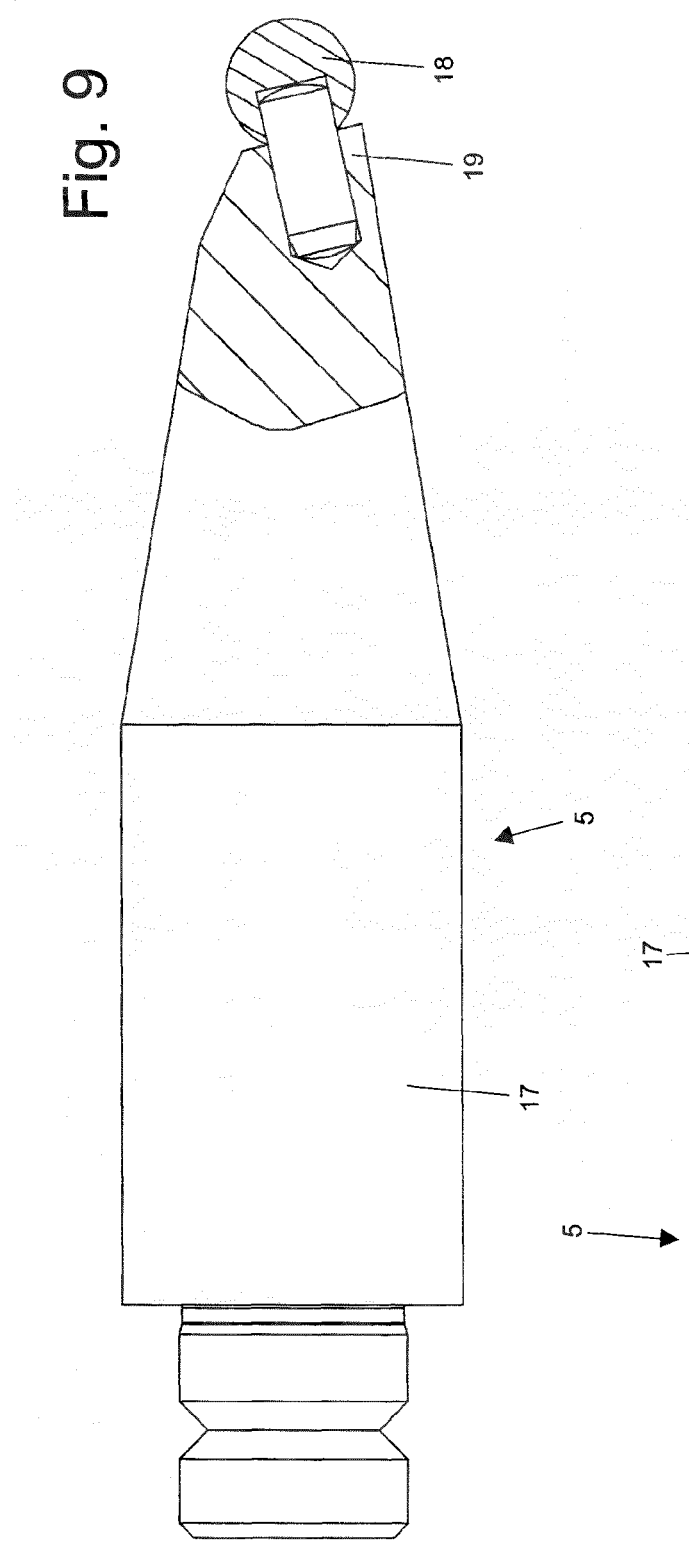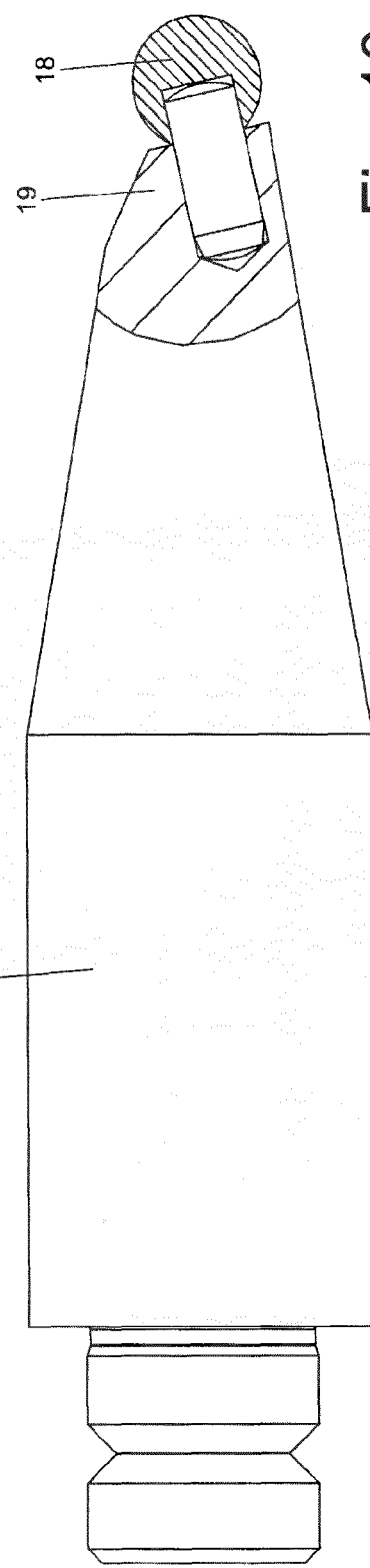

METHOD AND APPARATUS FOR MEASURING A MANUFACTURING DEVIATION IN AN EXTERNAL GEAR

TECHNICAL FIELD

The present invention relates to a method and an apparatus for measuring a manufacturing deviation in an external gear.

BACKGROUND ART

The U.S. Pat. No. 7,775,101B2 discloses an apparatus for measuring a manufacturing deviation in an external helical gear, in which a gear to be checked is arranged onto a stationary central pin, the external diameter of which is smaller than the internal diameter of the gear to be checked so that a relative movement between the gear to be checked and the pin is allowed. Moreover, the pin has a reference ball, which partially protrudes from a lateral surface of the pin and leans, in use, against an internal lateral surface of the gear to be checked. Under the stationary central pin, a lower face of the gear to be checked leans initially on a front rest ball, which partially protrudes from a support plane and is placed next to the reference ball, and on two back pads, the height of which above the support plane is lower than the one of the rest ball.

In use, a master gear (a master, that is a calibrated gear which is manufactured in an extremely accurate way and made of a very hard material) with external teeth analogous to the external teeth of the gear to be checked is laterally pushed against the gear to be checked with a predetermined strength (provided by an elastic member) to mesh with the gear to be checked.

When the two gears mesh, the gear to be checked is slightly lifted and its lower face continues to lean only on the front rest ball (that is, it doesn't contact the two back pads anymore).

Once the master gear and the gear to be checked are meshed as hereinbefore described, an electric motor mechanically connected to the master gear puts into (slow) rotation the master gear in order to put in rotation the gear to be checked, too, owing to the meshing between the two teeth. According to the check, the gear to be checked has to perform at least one complete rotation so that all the teeth of the gear to be checked mesh with the teeth of the master gear at a given instant of time of the check (obviously, it is possible that the gear to be checked performs more complete rotations in order to get a redundancy of data to average and limit the incidence of accidental errors).

The pin carrying the gear to be checked includes two groups of position sensors (typically two sets of three position sensors arranged symmetrically about the central axis), which are arranged along the pin at two different levels (that is, the two groups of sensor devices are staggered along the lateral surface of the pin). In each group of position sensors, the position sensors are all placed at the same level (that is, the position sensors are coplanar) and lie in a measuring plane perpendicular to the external lateral surface of the pin and to the internal lateral surface of the gear to be checked. Each position sensor is adapted to measure a distance lying between the external lateral surface of the pin and the internal lateral surface of the gear to be checked. Knowing the distance lying between the external lateral surface of the pin and the internal lateral surface of the gear to be checked at three different points of a same measuring plane, it is possible to determine in the same measuring plane the position of the central axis of the gear to be checked. Knowing the position of the central axis of the gear to be checked in two different measuring planes, it is possible to determine the position of the central axis of the gear to be checked. During a complete rotation of the gear to be checked, the real position of the central axis of the gear to be checked is cyclically determined according to the above-described procedure, and it is possible to accurately determine, at each point of the gear to be checked, the taper error and the lead error as a function of the deviation between the real position and the ideal position of the central axis of the gear to be checked.

The above-described apparatus enables to determine the taper error and the lead error with good accuracy in a workshop environment. However, the accuracy standards required are higher and higher.

Moreover, the above-described apparatus is relatively cumbersome, expensive and not very adaptable due to the need to employ the master gear, which is put into rotation by a servomotor. It should be noted that the master gear is particularly difficult and expensive to produce because on the one hand it has to be very accurately manufactured and on the other hand it has to be made of very hard material. Moreover, as the master gear has to be conjugated with the gear to be checked, each type of gear to be checked requires a corresponding master gear.

DISCLOSURE OF THE INVENTION

The object of the present invention is to provide a method and an apparatus for measuring a manufacturing deviation in an external gear that overcome the above-described inconveniences and can be easily and cheaply implemented at the same time.

The present invention provides a method and an apparatus for measuring a manufacturing deviation in an external gear according to what is claimed in the attached claims.

BRIEF DESCRIPTION OF THE DRAWINGS

The present invention is now described with reference to the attached sheets of drawings, given by way of non limiting examples, wherein:

FIG. 3 is a perspective view of a different embodiment of an apparatus for measuring a manufacturing deviation in an external gear;

FIGS. 4 and 5 are two different cross-sectional views of a detail of the apparatus shown in FIG. 3;

FIGS. 6 and 7 are two different perspective views of a head of a coupling member of the apparatus of FIG. 3;

FIG. 8 is a plan view, partially cross-sectioned, of the head of the coupling member of the apparatus of the FIG. 3; and FIGS. 9 and 10 are two different cross-sectional views taken along the lines IX-IX and X-X of the head of the coupling member of the apparatus of FIG. 3.

BEST MODE FOR CARRYING OUT THE INVENTION

Figure 1:
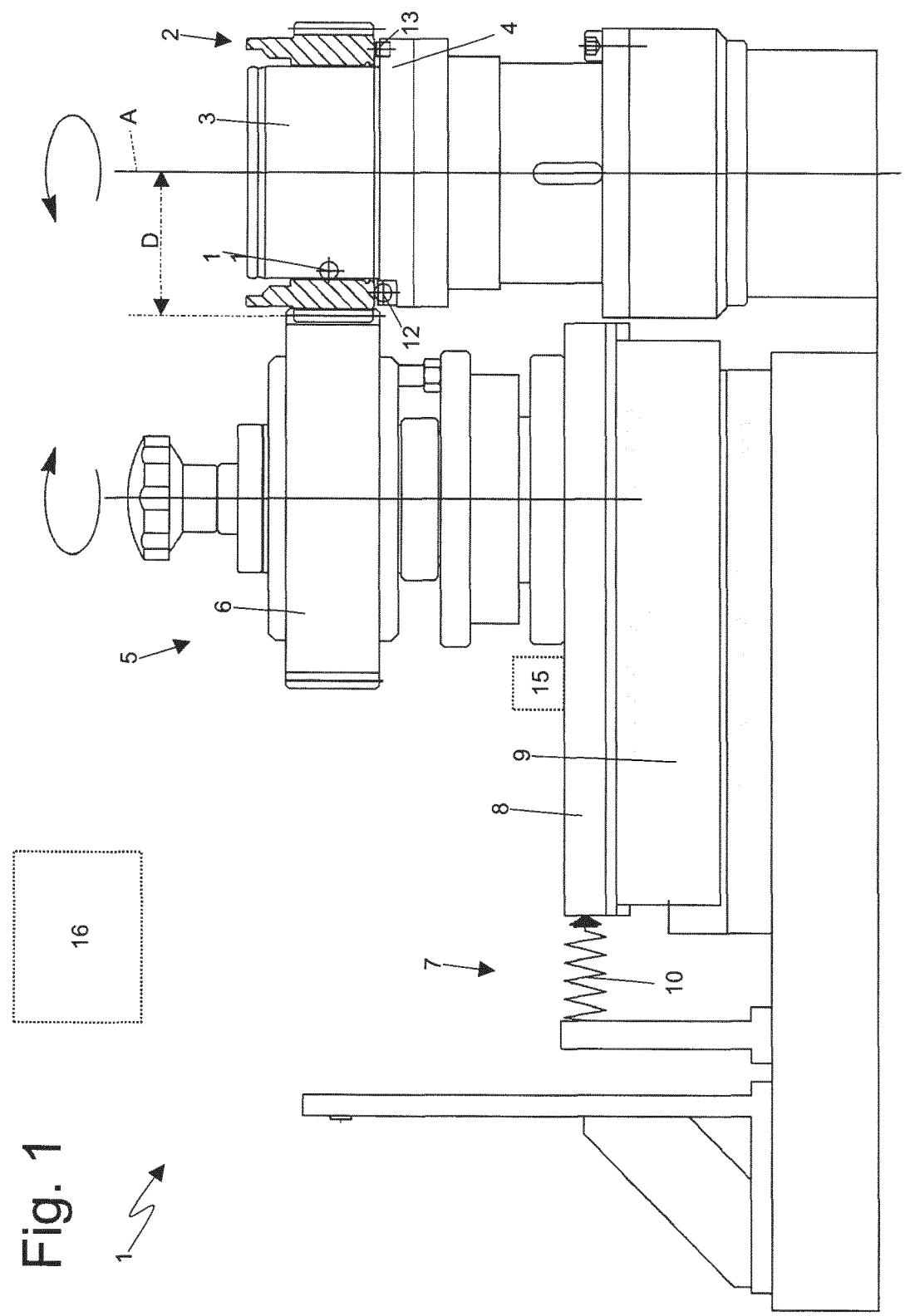
FIG. 1 is a simplified view, with some parts removed for the sake of clarity, of an apparatus for measuring a manufacturing deviation in an external gear.

In FIG. 1, reference number 1 indicates, on the whole, an apparatus for measuring manufacturing deviations of an external gear 2. Usually, but not necessarily, the external teeth of the gear 2 are helical teeth. In particular, the apparatus 1 measures the taper error and the lead error of the gear 2.

The apparatus includes a stationary central pin 3, which vertically protrudes from a horizontal support plane 4. The pin 3 is adapted to receive the gear 2 (in other words, the gear 2 can be arranged on the pin 3) and has an external diameter smaller than the internal diameter of the gear 2 so that a relative movement between the gear 2 and the pin 3 is allowed.

Moreover, the apparatus 1 includes a coupling member 5, which is arranged beside the pin 3 and is adapted to fit into the teeth of the gear 2.

In the embodiment shown in FIG. 1, the coupling member 5 includes a master gear ("master") 6 with external teeth analogous to the external teeth of the gear 2 and adapted to mesh with the external teeth of the gear 2. In particular, the master gear 6 is a calibrated gear that is manufactured with high accuracy and is made of a very hard material, such as hardened steel. The master gear 6 is rotatably mounted and is put into (slow) rotation by an electric motor, which is mechanically connected to the master gear 6.

The apparatus 1 comprises a thrust device 7, which is mechanically coupled to the coupling member 5 and is adapted to urge the coupling member 5 against the teeth of the gear 2 with a predetermined force in order to cause the coupling member 5 to mesh with the teeth of the gear 2 and concurrently bring an internal lateral surface of the gear 2 into engagement with an external lateral surface of the pin 3. According to a preferred embodiment, the coupling member 5 is mounted on a slide 8 sliding along a stationary guide 9 in a thrust direction perpendicular to the pin 3 (and thus perpendicular to a central axis A of the gear 2). The thrust device 7 includes a spring 10 (or another elastic element), which urges the slide 8 carrying the coupling member 5 towards the pin 3 with the predetermined force.

The pin is provided with (at least) one abutment ball 11, which partially protrudes from a lateral surface of the pin facing the coupling element 5 in such a way that the internal lateral surface of the gear 2 rests against the abutment ball 11 when the gear 2 is urged towards the pin 3 by the coupling member 5.

The support plane 4 has a front rest ball 12 arranged at the abutment ball 11 (that is, it is arranged next to the coupling member 5) and partially protruding from the support plane 4, and two back abutment pads 13, which partially protrude from the support plane 4 and are arranged at the side of the pin 3 opposite to the front rest ball 12 (in other words, they are arranged far from the coupling member 5). The front rest ball 12 is (slightly) higher than the two back abutment pads 13. More specifically, the top of the front rest ball 12 is (slightly) higher than the top of the back abutment pads 13.

At the beginning, the gear 2, more specifically a lower face of the gear 2, leans on both the front rest ball 12 and the back abutment pads 13, and thus the gear is slightly sloping with respect to the horizontal support plane 4. When the coupling member 5 laterally pushes the gear 2, the gear 2, more specifically its lower face, is lifted from the back abutment pads 13 in such a way that the lower face of the gear 2 leans only on the front rest ball 12. In other words, due to the thrust applied by the coupling member 5, the gear 2, more specifically its lower face, lifts from the back abutment pads performing a limited rotation on the front rest ball 12.

Figure 2:
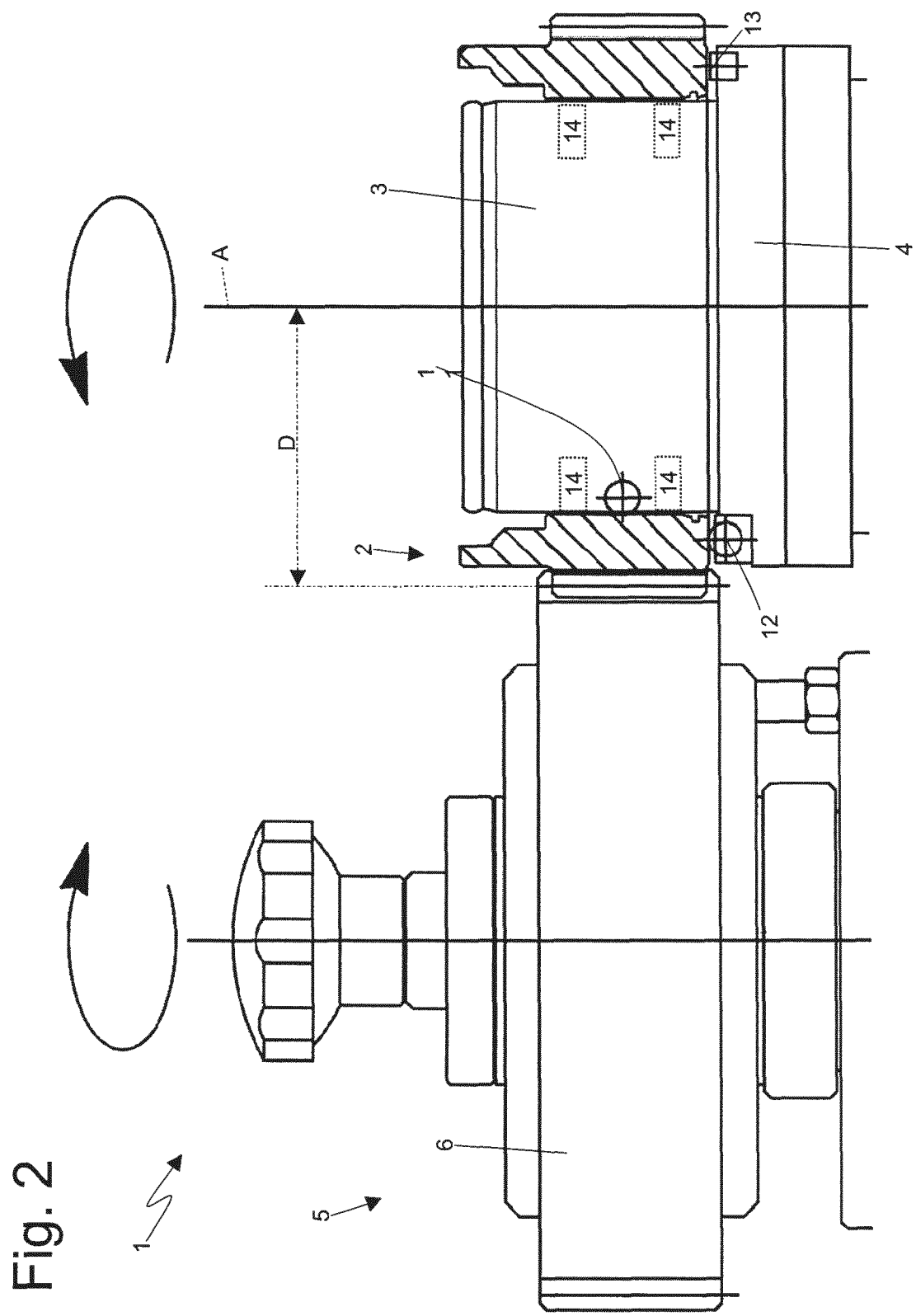
FIG. 2 is a view, shown at an enlarged scale, of a detail of the apparatus of FIG. 1.

According to what is shown in FIG. 2, the pin 3 carrying the gear 2 is provided with two groups of position sensors (typically two sets of three position sensors 14 symmetrically arranged about the central axis, even thought FIG. 2 shows, for the sake of simplicity, two couples of diametrically opposed sensors), which are arranged along the pin 3 at two different levels (that is, the two groups of position sensors 14 are vertically staggered along the lateral surface of the pin 3). According to a preferred embodiment, the position sensors 14 are sensors using the LVDT ("Linear Variable Differential Transformer") technology. In each group of position sensors 14, the position sensors 14 are all arranged at the same level (that is, the position sensors 14 are coplanar) and lie in a measuring plane perpendicular to the external lateral surface of the pin 3 and to the internal lateral surface of the gear 2. Each position sensor 14 is adapted to measure a distance lying between the external lateral surface of the pin 3 and the internal lateral surface of the gear 2. Knowing the distance lying between the external lateral surface of the pin 3 and the internal lateral surface of the gear 2 at three different points of a same measuring plane, it is possible to determine the position of the central axis A of the gear 2 in the same measuring plane. Knowing the position of the central axis A of the gear 2 in two different measuring planes, it is possible to determine the position of the central axis A of the gear 2.

According to what is shown in FIG. 1, the apparatus 1 includes a control unit 16, and a position sensor 15 (of a known type, shown in a very simplified way), which is mechanically connected to the coupling member 5 (that is, the position sensor 15 or at least one component of the position sensor 15 is integral with the coupling member 5 to move together with the coupling member 5 itself with respect to a fixed, reference part, for instance the stationary guide 9). In the embodiment shown in FIG. 1, the position transducer 15, or a movable component of it, is fixed to the slide 8 on which the master gear 6 is mounted. Thanks to the measure provided by the position sensor 15, it is possible to determine a reference distance D that is indicative of a radial dimension of the gear 2, typically it is correlated with the OBR/OBD ("Over Ball Radius"-"Over Ball Dimension") of the gear 2. More specifically, the reference distance D can be equal to the OBR/ODR of the gear 2 or can depend on the OBR/OBD of the gear 2 directly. In the embodiment shown in FIGS. 1 and 2, the reference distance D is the distance lying between the central axis A of the gear 2 (the position of the central axis A is determined by using the measures provided by the position sensors 14 as described above) and a reference point of the coupling member 5 (the position of which along the displacement direction of the coupling member 5 is determined by the measure provided by the position sensor 15). In the embodiment shown in FIGS. 1 and 2, the reference distance D is correlated with the OBR of the gear 2, that is, it is proportional to the OBR of the gear 2. In particular, between the reference distance D and the OBR of the gear 2 there is a difference due to the fact that for measuring the OBR a tooth space of the gear 2 engages a ball (the most external point of which determines the point from which OBR is measured), while in the embodiment shown in FIGS. 1 and 2 the tooth spaces of the gear 2 engage the teeth of the master gear 6.

According to a different embodiment, the reference distance D is determined in a measuring station independent of the apparatus 1, before or after the measures on the gear 2 are carried out by the apparatus 1. In this case, the value of the reference distance D may be provided to the control unit 16 by means of an input device (for example, a physical keyboard or a touch screen keyboard, per se known and not shown in the drawings).

The control unit 16 controls the operation of the apparatus 1 and in particular receives the measures provided by the position sensors 14 coupled to the pin 3 and the measure provided by the position sensor 15 mechanically connected to the coupling member 5.

In use, the control unit 16 employs the measures provided by the position sensors 14 to determine, according to the above-described procedure, the position of the central axis A of the gear 2. Moreover, the control unit 16 employs the measure provided by the position sensor 15 to determine, according to the above-described procedure, the reference distance D.

The control unit 16 determines the manufacturing deviations of the gear 2 (that is, the taper error and the lead error) as a function of the position of the central axis A of the gear 2. In particular, the control unit 16 determines the manufacturing deviations of the gear 2 as a function of the deviation between the real position and the ideal position of the central axis A of the gear 2.

In the embodiment shown in FIGS. 1 and 2, if there were no manufacturing deviations, the central axis A of the gear 2 would be perfectly parallel to the central axis of the pin 3. Hence, it would be possible to determine the manufacturing deviations of the gear 2 as a function of the inclinations of the central axis A of the gear 2 with respect to the central axis of the pin 3 when the coupling member 5 is urged against the teeth of the gear 2.

Assuming that the central axis of the pin 3 is perfectly vertical, the taper error is a function of the inclination of the central axis A of the gear 2 with respect to a first horizontal axis (thus perpendicular to the central axis of the pin 3) perpendicular to the plane of the sheet of FIG. 1, and the lead error is a function of the inclination of the central axis A of the gear 2 with respect to a second horizontal axis (thus perpendicular to the central axis of the pin 3) lying in the plane of the sheet of FIG. 1 (therefore, the second horizontal axis is perpendicular to the first horizontal axis).

Moreover, the control unit 16 determines, for each manufacturing deviation of the gear 2, a correction value as a function of the reference distance D and thus corrects, by applying the correction value, each manufacturing deviation determined as a function of the position of the central axis A of the gear 2. In other words, it has been experimentally and surprisingly discovered that the measure of the manufacturing deviations of the gear 2 provided by the apparatus 1 is affected by the radial dimensions of the gear 2. That is to say, although the manufacturing deviations physically included in a gear 2 are the same, the measure of the manufacturing deviations of the gear 2 provided by the apparatus 1 changes (in an undesired manner) as radial dimensions of the gear 2 changes. In order to noticeably increase the accuracy in the measure of the manufacturing deviations of the gear 2 provided by the apparatus 1 in comparison with the measure provided by coordinate machines such as laboratory involute testing machines, it has been discovered that it is possible to apply to the measure of the manufacturing deviations a correction value depending on the reference distance D which is indicative of the radial dimension of the gear 2 (for instance, the reference distance D can be correlated with the OBR/OBD of the gear 2).

To determine, for each manufacturing deviation, the correction value as a function of the reference distance D, it is possible to employ a table based on experimental tests or a mathematical function, such as an equation based on experimental tests or theory.

In the apparatus 1 shown in FIGS. 1 and 2, in use, the control unit 16 causes (by driving the electric motor) a (slow) rotation of the master gear 6, after the master gear 6 is engaged with the gear 2, to cause a corresponding rotation of the gear 2 and thus determine the manufacturing deviations of the gear 2 at more, different points. In other words, according to the test, the gear 2 performs at least one complete rotation so that all the teeth of the gear 2 mesh with the teeth of the master gear 6 at a given instant of the test (obviously, it is possible that the gear 2 performs a plurality of complete rotations in order to get a redundancy of data to average and limit the incidence of accidental errors).

In the apparatus 1 shown in FIGS. 1 and 2, the coupling member 5 includes the master gear 6, which is brought in contact with the gear 2 and causes, due to its rotation, a corresponding rotation of the gear 2. According to the embodiment shown in FIGS. 3-10, the coupling member 5 includes, instead of the master gear 6, a head 17 with two coupling balls 18, which are spaced apart and are adapted to fit into the tooth spaces of the gear 2. Preferably, but not necessarily, the two coupling balls 18 of the coupling member 5 are adapted to fit into the same tooth space of the gear 2. According to a preferred embodiment, the diameter of each coupling ball 18 is equal to the diameter of the ball used to measure the OBR/OBD of the gear 2. Preferably, the head 17 is fork shaped and is provided with two prongs 19, each of them supporting a corresponding coupling ball 18.

According to a different, not shown embodiment, the head 17 has, instead of the two coupling balls 18, a single tooth that fits into a tooth space of the gear 2.

As previously described with reference to the apparatus 1 shown in FIGS. 1 and 2, also in the apparatus 1 shown in FIGS. 3-10 the coupling member 5, and thus the head 17, is movable along the thrust direction. In this case, it is movable only along the thrust direction that is perpendicular to the central axis A of the gear 2.

According to what is illustrated in FIG. 3, the head 17 is carried by the slide 8 that is slidably mounted along the thrust direction perpendicular to the central axis A of the gear 2. In this embodiment, the thrust device 7 includes a couple of springs 10, which are placed on opposite sides of the head 17 and push the slide 8. In this embodiment too, the position sensor 15, or a movable component of the position sensor 15, is mechanically coupled to the slide 8.

According to what is shown in FIGS. 4 and 5, the reference distance D is determined as a function of the measure provided by the position sensor 15 and is indicative of the radial dimension of the gear 2. The reference distance D can correspond to the OBR, in case that, as previously stated, the balls 18 of the head 17 have a diameter equal to the diameter of the ball that is used to measure the OBR/OBD of the gear 2.

The above-described method for measuring the manufacturing deviations of the gear 2 has many advantages.

First of all, due to the compensation determined by the correction values, the above-described method enables to very accurately determine the size of the manufacturing deviations of the gear 2. Tests have demonstrated that, thanks to the compensation determined by the correction values, it is possible to have an accuracy comparable with the accuracy that can be achieved with a laboratory involute testing machine.

Moreover, the above-described method can be easily and cheaply implemented as it requires a modest hardware modification (that is, the addition of the position sensor 15) which does not involve substantial changes in the structure, and a modest software modification (that is, the calculation and the application of the correction values) which neither requires a high computing power nor uses a large amount of memory. In particular, the above-described method can be implemented even in an existing apparatus without the position sensor 15. In this case, the reference distance D is measured in an external measuring station.

The apparatus 1 shown in FIGS. 3-10 is particularly cheap, compact and flexible because the gear 6 (that is difficult and expensive to produce and must be replaced each time when the type of gear 2 to be checked changes) is substituted by the head 17 with the two coupling balls 18, which is definitely easier and cheaper to produce.

Moreover, the apparatus 1 shown in FIGS. 3-10 does not requires any motor drive for the coupling member 5 because all the movements are performed manually (easily and without effort) by an operator.

The invention claimed is:

1. An apparatus for measuring a manufacturing deviation in an external gear; the apparatus includes:
    a stationary central pin that is adapted to receive the gear and has an external diameter smaller than the internal diameter of the gear so that a relative movement between the gear and the pin is allowed;
    a coupling member that is movably mounted beside the gear and is adapted to fit into the teeth of the gear;
    a thrust device urging with a predetermined force the coupling member against the teeth of the gear in order to concurrently cause the coupling member to fit into the teeth, and an internal, lateral surface of the gear to contact an external, lateral surface of the pin;
    sensor devices for determining the position of a central axis of the gear; and
    a control unit determining the manufacturing deviation in the gear as a function of the position of the central axis of the gear;
    wherein the coupling member includes a head that does not rotate and is adapted to fit into the teeth of the gear.

2. The apparatus according to claim 1, wherein the head has two coupling balls that are spaced apart and are adapted to fit into the tooth spaces of the teeth of the gear.

3. The apparatus according to claim 2, wherein the two coupling balls of the coupling member are adapted to fit both into the same tooth space of the teeth of the gear.

4. The apparatus according to claim 2, wherein the diameter of each coupling ball is equal to the diameter of the ball used for measuring the OBR/OBD ("Over Ball Radius"/ "Over Ball Dimension") of the gear.

5. The apparatus according to claim 2, wherein the head is fork shaped and has two prongs, each of them supporting a corresponding coupling ball.

6. The apparatus according to claim 1, wherein the head can displace only along a thrust direction perpendicular to the central axis of the gear.

7. The apparatus according to claim 1, wherein the pin has an abutment ball that partially protrudes from a lateral surface of the pin facing the coupling member in such a way that the internal, lateral surface of the gear rests against the abutment ball when the gear is urged towards the pin by the coupling member.

8. The apparatus according to claim 1 further including a support plane and at least one back abutment pad and a front rest ball protruding from said support plane, said front rest ball being arranged next to the abutment ball and being higher than said at least one back abutment pad, wherein the gear is adapted to lean on said at least one back abutment pad and said front rest ball and to lift, owing to the thrust applied by the coupling member, from said at least one back abutment pad in such a way as to lean only on the front rest ball.

9. The apparatus according to claim 1, wherein:
    the sensor devices include two groups of distance sensors which measure, in each one of two different, spaced apart measuring planes, at least three distances lying between the external, lateral surface of the pin and the internal, lateral surface of the gear;
    the control unit determines, in each one of the two measuring planes, the position of the central axis as a function of the three distances lying between the external, lateral surface of the pin and the internal, lateral surface of the gear; and
    the control unit determines the position of the central axis of the gear as a function of the position of the central axis of the gear in the two measuring planes.

10. The apparatus according to claim 1, including a position sensor, wherein the position sensor is adapted to measure a reference distance that is indicative of a radial dimension of the gear, the control unit being adapted to determine a correction value as a function of the reference distance and to correct, by applying the correction value, the manufacturing deviation determined as a function of the position of the central axis of the gear.

11. The apparatus according to claim 10, wherein the position sensor is connected to the coupling member.

12. The apparatus according to claim 10, wherein the reference distance is the distance lying between the central axis of the gear and a reference point of the coupling member.

13. A method for measuring a manufacturing deviation in an external gear; the method including the steps of:
    placing the gear onto a stationary central pin which has an external diameter smaller than the internal diameter of the gear so that a relative movement between the gear and the pin is allowed;
    placing beside the gear a coupling member that is adapted to fit into the teeth of the gear;
    urging with a predetermined force the coupling member against the teeth of the gear in order to concurrently cause the coupling member to fit into the teeth and an internal, lateral surface of the gear to contact an external, lateral surface of the pin;
    determining the position of a central axis of the gear; and
    determining the manufacturing deviation in the gear as a function of the position of the central axis of the gear;
    wherein the method includes the further steps of:
    measuring a reference distance that is indicative of a radial dimension of the gear;
    determining a correction value as a function of the reference distance; and
    correcting, by applying the correction value, the manufacturing deviation determined as a function of the position of the central axis of the gear.

14. The method according to claim 13 and including the further step of measuring the reference distance by means of a position sensor which is mechanically connected to the coupling member.

15. The method according to claim 13, wherein the reference distance is the distance lying between the central axis of the gear and a reference point of the coupling member.

16. The method according to claim 13, wherein the pin has an abutment ball which partially protrudes from a lateral surface of the pin facing the coupling member in such a way that the internal, lateral surface of the gear rests against the abutment ball when the gear is urged towards the pin by the coupling member.

17. The method according to claim 16 and including the further steps of:
    leaning a lower face of the gear on at least one back abutment pad and on a front rest ball partially protruding from a support plane, said front rest ball being arranged next to the abutment ball and being higher than said at least one back abutment pad; and
    lifting, owing to the thrust applied by the coupling member, the lower face of the gear from said at least one back abutment pad in such a way that the lower face of the gear leans only on the front rest ball.

18. The method according to claim 13 and including the further steps of:
- measuring in each one of two different, spaced apart measuring planes at least three distances lying between the external, lateral surface of the pin and the internal, lateral surface of the gear;
- determining, in each one of the two measuring planes, the position of the central axis of the gear as a function of the three distances lying between the external, lateral surface of the pin and the internal, lateral surface of the gear; and
- determining the position of the central axis of the gear as a function of the position of the central axis of the gear in the two measuring planes.

19. The method according to claim 13, wherein the coupling member includes a master gear with external teeth analogous to the external teeth of the gear, the method including the further step of rotating the master gear, after the master gear has engaged the gear, for causing a corresponding rotation of the gear and thus determining the manufacturing deviation in the gear at more, different points.

20. The method according to claim 13, wherein the coupling member includes a head that does not rotate and is adapted to fit into the teeth of the gear.

21. The method according to claim 20, wherein the head has two coupling balls that are spaced apart and are adapted to fit into the tooth spaces of the teeth of the gear.

22. The method according to claim 21, wherein the two coupling balls of the coupling member are adapted to fit into the same tooth space of the teeth of the gear.

23. The method according to claim 20, wherein the head can only displace along a thrust direction perpendicular to the central axis of the gear.

* * * * *